US012589967B2

(12) United States Patent
Ishii et al.

(10) Patent No.: US 12,589,967 B2
(45) Date of Patent: Mar. 31, 2026

(54) PAPER SHEET HANDLING APPARATUS

(71) Applicant: FUJITSU FRONTECH LIMITED, Inagi (JP)

(72) Inventors: Nobuhiko Ishii, Inagi (JP); Hisao Izumi, Inagi (JP); Yasushi Gotoh, Inagi (JP); Tatsuya Shimamura, Inagi (JP); Tomohiro Yamada, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 18/790,424

(22) Filed: Jul. 31, 2024

(65) Prior Publication Data

US 2024/0383714 A1 Nov. 21, 2024

Related U.S. Application Data

(63) Continuation of application No. PCT/JP2022/007138, filed on Feb. 22, 2022.

(51) Int. Cl.

| | |
|---|---|
| ***B65H 29/52*** | (2006.01) |
| ***G07D 11/10*** | (2019.01) |
| ***G07D 11/16*** | (2019.01) |
| ***G07D 11/26*** | (2019.01) |

(52) U.S. Cl.

CPC ............. *B65H 29/52* (2013.01); *G07D 11/10* (2019.01); *G07D 11/16* (2019.01); *G07D 11/26* (2019.01); *B65H 2601/11* (2013.01); *B65H 2701/1912* (2013.01)

(58) Field of Classification Search

CPC ....................... B65H 29/52; B65H 2701/1912; G07D 11/16; G07D 11/10

See application file for complete search history.

(56) References Cited

U.S. PATENT DOCUMENTS

| | | | | |
|---|---|---|---|---|
| 10,011,446 B2 * | 7/2018 | Iwasaki | .................... | B65H 5/26 |
| 2002/0074709 A1 | 6/2002 | Kanagawa | | |
| 2009/0212493 A1 | 8/2009 | Sugahara et al. | | |
| 2015/0307306 A1 | 10/2015 | Kadota | | |
| 2021/0198072 A1 | 7/2021 | Imoto | | |

FOREIGN PATENT DOCUMENTS

| | | |
|---|---|---|
| JP | 2002163704 A | 6/2002 |
| JP | 2009205252 A | 9/2009 |
| JP | 2013061865 A | 4/2013 |
| JP | 2014123222 A | 7/2014 |
| JP | 2014209377 A | 11/2014 |
| JP | 2016004518 A | 1/2016 |
| WO | 2012056789 A1 | 5/2012 |

OTHER PUBLICATIONS

ISR issued in PCT/JP2022/007138, mailed May 10, 2022.
Written Opinion of the ISA issued in PCT/JP2022/007138, mailed May 10, 2022.
Search Report issued in corresponding EP Application No. EP 22 928 509.3, dated Apr. 3, 2025.

* cited by examiner

*Primary Examiner* — Jeremy R Severson
(74) *Attorney, Agent, or Firm* — Greer Burns & Crain Ltd.

(57) ABSTRACT

A paper sheet handling apparatus includes: a drawable drawer module; a cross conveyor configured to convey, between the cross conveyor and the drawer module, a paper sheet in a cross direction crossing a pull-out direction of the drawer module; and a biasing guide disposed at an end portion of the cross conveyor on a side of the drawer module and configured to bias the drawer module in the cross direction.

3 Claims, 13 Drawing Sheets

PAPER SHEET HANDLING APPARATUS

CROSS-REFERENCE TO RELATED APPLICATION

This application is continuation application of International Application PCT/JP2022/007138 filed on Feb. 22, 2022 and designated the U.S., the entire contents of which are incorporated herein by reference.

TECHNICAL FIELD

Embodiments discussed herein are relate to a paper sheet handling apparatus.

BACKGROUND ART

In a paper sheet handling apparatus used in an automated teller machine (ATM), a deposition machine, or the like, a drawer module may be disposed so as to be drawable. The drawer module, for example, conveys and stores a paper sheet.

Conventionally, in order to enhance workability at the time of exposure of a drawer, there has been proposed a medium transaction apparatus that extends the entire length of a positioning unit by a detent spring in an exposed state in which a banknote storage unit is exposed to the outside of a banknote processing unit casing and suppresses the positioning unit to be in the exposed state (refer to, for example, JP 2013-061865 A).

In addition, in order to prevent money from being caught in a gap or from jumping out of the gap when money is sent from an upper storage unit to a lower storage unit, there has been proposed a coin processing apparatus provided with a gap adjustment mechanism that closes each of gaps between a position fixing guide unit positioned between the upper and lower storage units that can be drawable and the upper and lower storage units (refer to, for example, JP 2016-004518 A).

SUMMARY

A paper sheet handling apparatus according to the present disclosure includes: a drawable drawer module; a cross conveyor configured to convey, between the cross conveyor and the drawer module, a paper sheet in a cross direction crossing a pull-out direction of the drawer module; and a biasing guide disposed at an end portion of the cross conveyor on a side of the drawer module and configured to bias the drawer module in the cross direction.

The object and advantages of the present invention will be realized by the elements set forth in the claims or combinations thereof.

DESCRIPTION OF EMBODIMENTS

Meanwhile, in a paper sheet handling apparatus such as a banknote processing machine, there is a case in which a cross conveyance unit that conveys a paper sheet in a cross direction crossing a pull-out direction is disposed between the paper sheet handling apparatus and a drawable drawer module.

When such a drawer module and a cross conveyance unit are arranged, a gap is provided between the drawer module and the cross conveyance unit so that damage due to contact between the drawer module and the cross conveyance unit does not occur when the drawer module is housed. In consideration of an assembly accumulation error including a component dimensional variation of, the gap is bound by the component dimensional accuracy so that the drawer module and the cross conveyance unit do not interfere with each other and the gap does not become wide enough to interfere with conveyance of the paper sheet even if a dimensional variation range becomes wide. However, it is difficult to flexibly cope with an unexpected change in a minute distance between the drawer module and the cross conveyance unit and a change in a positional relationship in order to secure a condition with component dimensional accuracy by a fixed component.

In addition, for example, in a case where the drawer module has an openable and closable opening/closing conveyance unit, when the drawer module is housed in the half-opened half-locked state of the opening/closing conveyance unit, it is desirable that the opening/closing conveyance unit comes into contact with the cross conveyance unit or the like and transitions from the half-locked state to the locked state. In addition to the case in which the opening/closing conveyance unit is disposed as described above, it may be desirable to press the drawer module in a cross direction crossing a pull-out direction in order to perform delivery of the paper sheets to and from the cross conveyance unit or to prevent rattling. However, as described above, when the cross conveyance unit and the drawer module are brought into contact with each other or a gap therebetween is narrowed in order to press the drawer module in the cross direction, for example, contact may occur, and it is difficult to make the gap minute due to component dimensional variation or the like.

Hereinafter, a paper sheet handling apparatus according to an embodiment of the present invention will be described with reference to drawings using a banknote processing machine 1 as an example.

Figure 1:
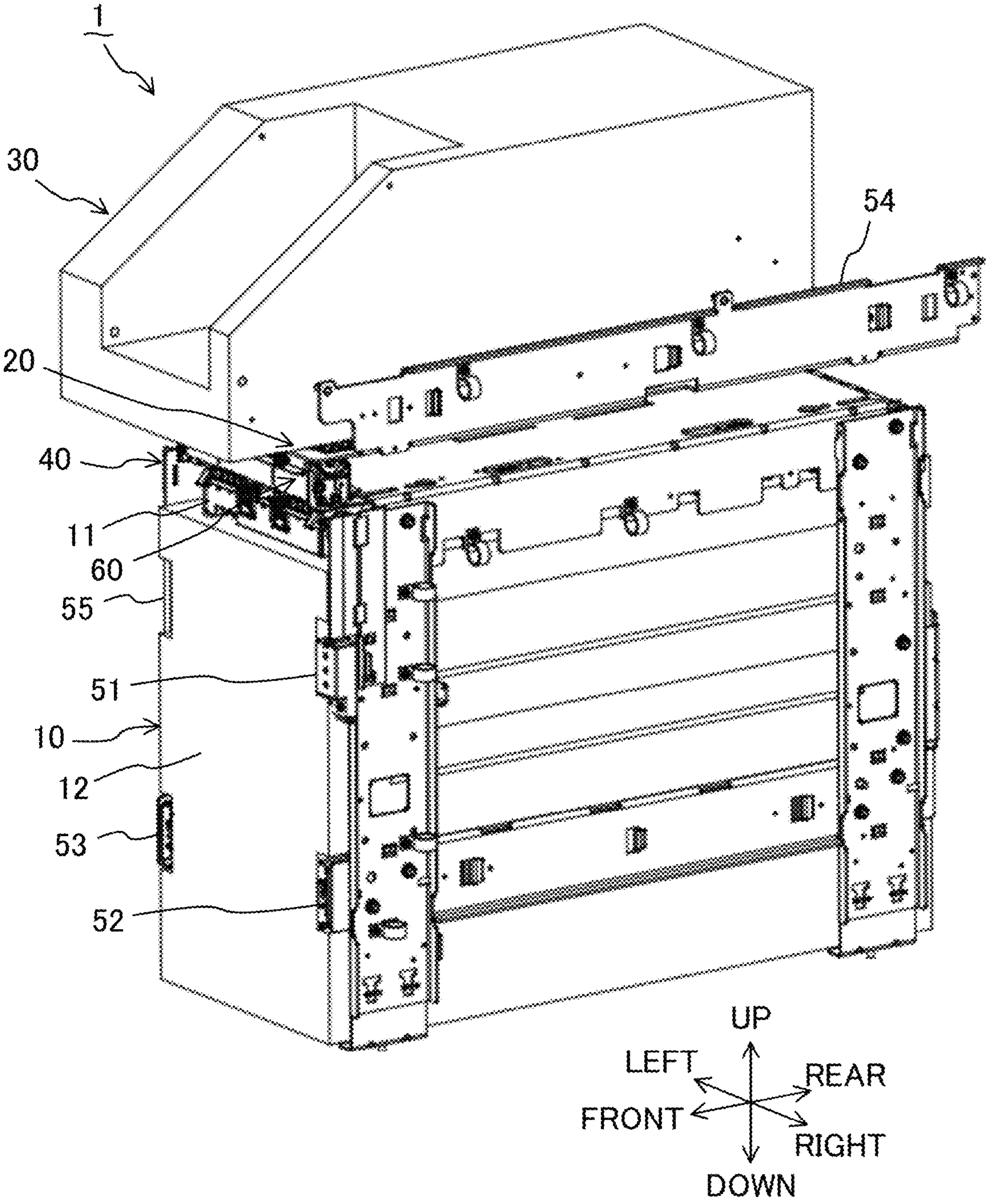
FIG. 1 is a perspective view illustrating a banknote processing machine according to an embodiment.

FIG. 1 is a left side view illustrating an internal structure of the banknote processing machine 1.

It is noted that an upward-and-downward direction, a forward-and-rearward direction, and a left-and-right direction illustrated in FIG. 1 and FIGS. 2 to 12B to be described below are illustrative only in a case where a customer side of the banknote processing machine 1 is the front direction. For example, the upward-and-downward direction is a vertical direction, and the forward-and-rearward direction and the left-and-right direction are horizontal directions.

The banknote processing machine 1 illustrated in FIG. 1 is used for, for example, an ATM, a bill recycle unit (BRU), a cash dispenser (CD), a teller cash recycler (TCR), and the like, and includes a lower module 10, an intermediate conveyance unit 20, an upper module 30, a frame 40, slide rails 51 to 55, and a guide mechanism 60. It is noted that a banknote is an example of a paper sheet, and the banknote processing machine 1 is an example of the paper sheet handling apparatus. The paper sheet handling apparatus may be any apparatus as long as the apparatus conveys the paper sheet or performs some processing on the paper sheet.

The lower module 10 is an example of a drawable drawer module, and for example, can be housed inside the frame 40 and pulled out both forwards and rearwards along the three slide rails 51 to 53 and 55 extending in the forward-and-rearward direction. However, it is sufficient that the lower module 10 can be drawable in at least one direction (for example, forwards).

The lower module 10 includes an opening/closing conveyance unit (opening/closing conveyor) 11 disposed at a front portion in the uppermost stage of the lower module 10, and a banknote accommodation unit 12 disposed below the opening/closing conveyance unit 11 and configured to accommodate, for example, a plurality of cassettes for accommodating banknotes.

Figure 5:
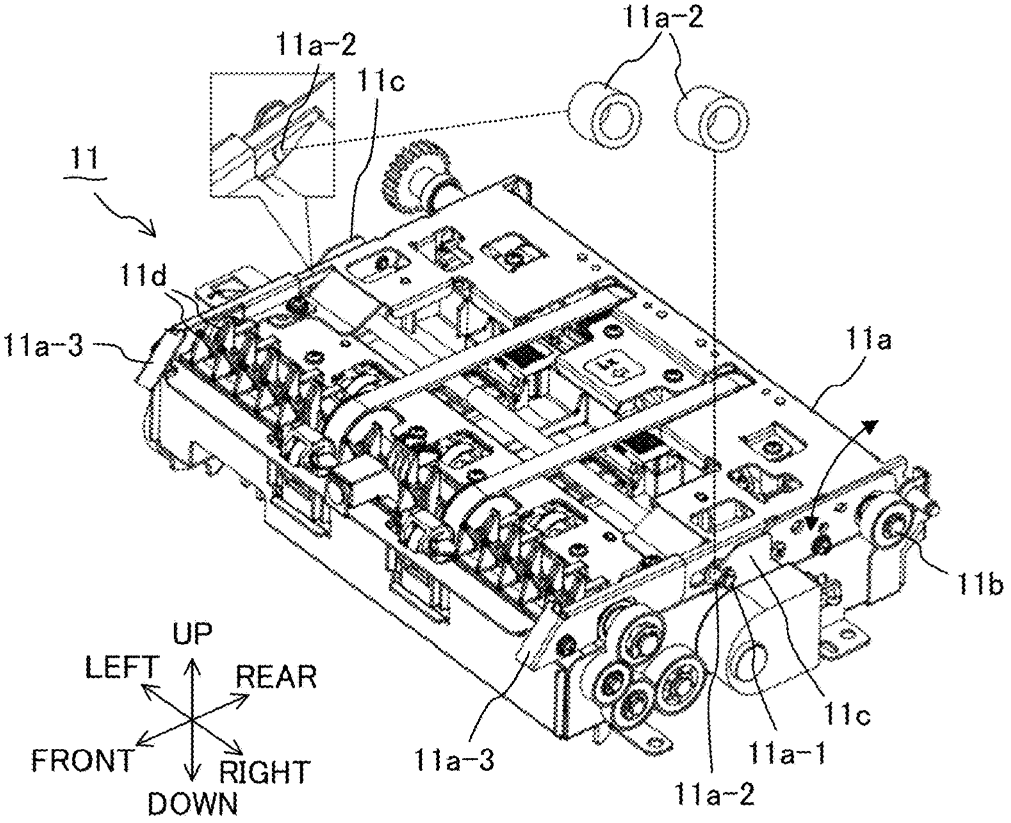
FIG. 5 is a perspective view illustrating the opening/closing conveyance unit according to the embodiment.

As illustrated in FIG. 5, the opening/closing conveyance unit 11 includes an opening portion 11*a*, an opening/closing shaft 11*b*, a lock member 11*c*, and a comb tooth guide 11*d*.

The opening portion 11*a* is provided over the entire upper portion of the opening/closing conveyance unit 11. The opening portion 11*a* rotates around the opening/closing shaft 11*b* provided at a rear portion of the opening/closing conveyance unit 11 and formed to extend in the left-and-right direction (refer to an arrow in FIG. 5). Then, as illustrated in FIG. 5, the opening portion 11*a* is locked in a horizontal state and is opened from the front side by rotating upwards to expose the inside of the opening/closing conveyance unit 11.

The opening portion 11*a* has a lock shaft 11*a*-1, two collars 11*a*-2, and two tip guides 11*a*-3.

The lock shaft 11*a*-1 extends in the left-and-right direction in the vicinity of the center of the opening portion 11*a* in the forward-and-rearward direction, and protrudes from both left and right ends of the opening portion 11*a*. Further, the lock shaft 11*a*-1 is biased rearwards by an elastic body (not illustrated), and is hooked on the lock member 11*c* at each of the left and right ends when the opening portion 11*a* is in the horizontal state. As a result, the opening/closing conveyance unit 11 is in the locked state. It is noted that, when the opening portion 11*a* is opened, the lock shaft 11*a*-1 is moved forwards against biasing force of the elastic body (not illustrated) so as to release the state of being hooked on the lock member 11*c*, and the opening portion 11*a* is rotated upwards around the opening/closing shaft 11*b*.

The two collars 11*a*-2 are rotatably disposed at both left and right ends of the non-rotatable lock shaft 11*a*-1 and contact the lock member 11*c*. As a result, the lock shaft 11*a*-1 can smoothly move along the lock member 11*c* and be caught by the lock member 11*c*.

The two tip guides 11*a*-3 are provided at front portions of both left and right ends of the opening portion 11*a*, and are provided so as to be inclined downwards toward the front side. Accordingly, as will be described later, when the opening/closing conveyance unit 11 is housed from the rear side, the opening/closing conveyance unit 11 (lower module 10) is easily housed.

The comb tooth guide 11*d* guides banknotes conveyed to and from the intermediate conveyance unit 20 to be described later.

Figure 2:
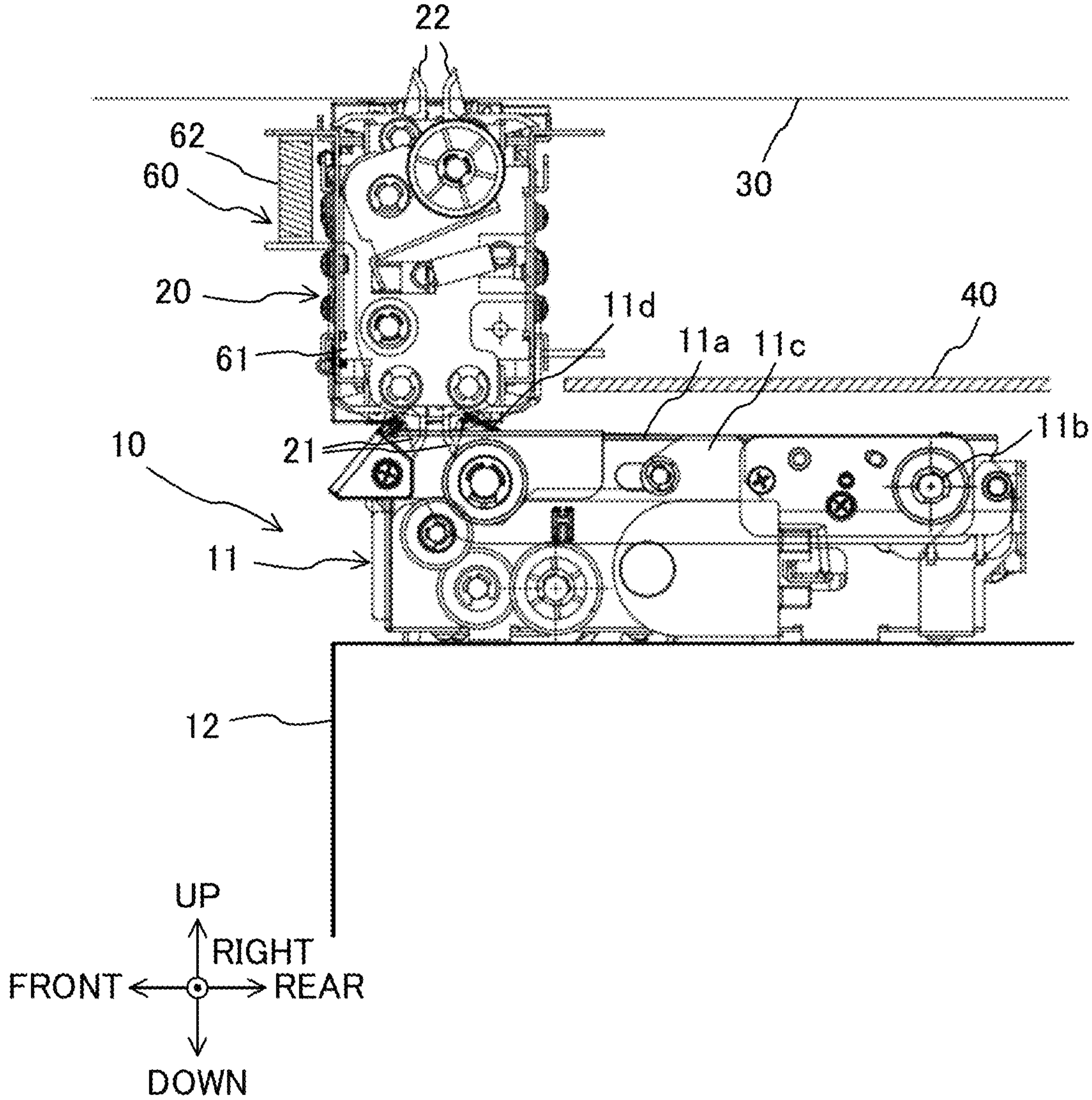
FIG. 2 is a right side view illustrating an opening/closing conveyance unit and an intermediate conveyance unit according to the embodiment.
Figure 3:
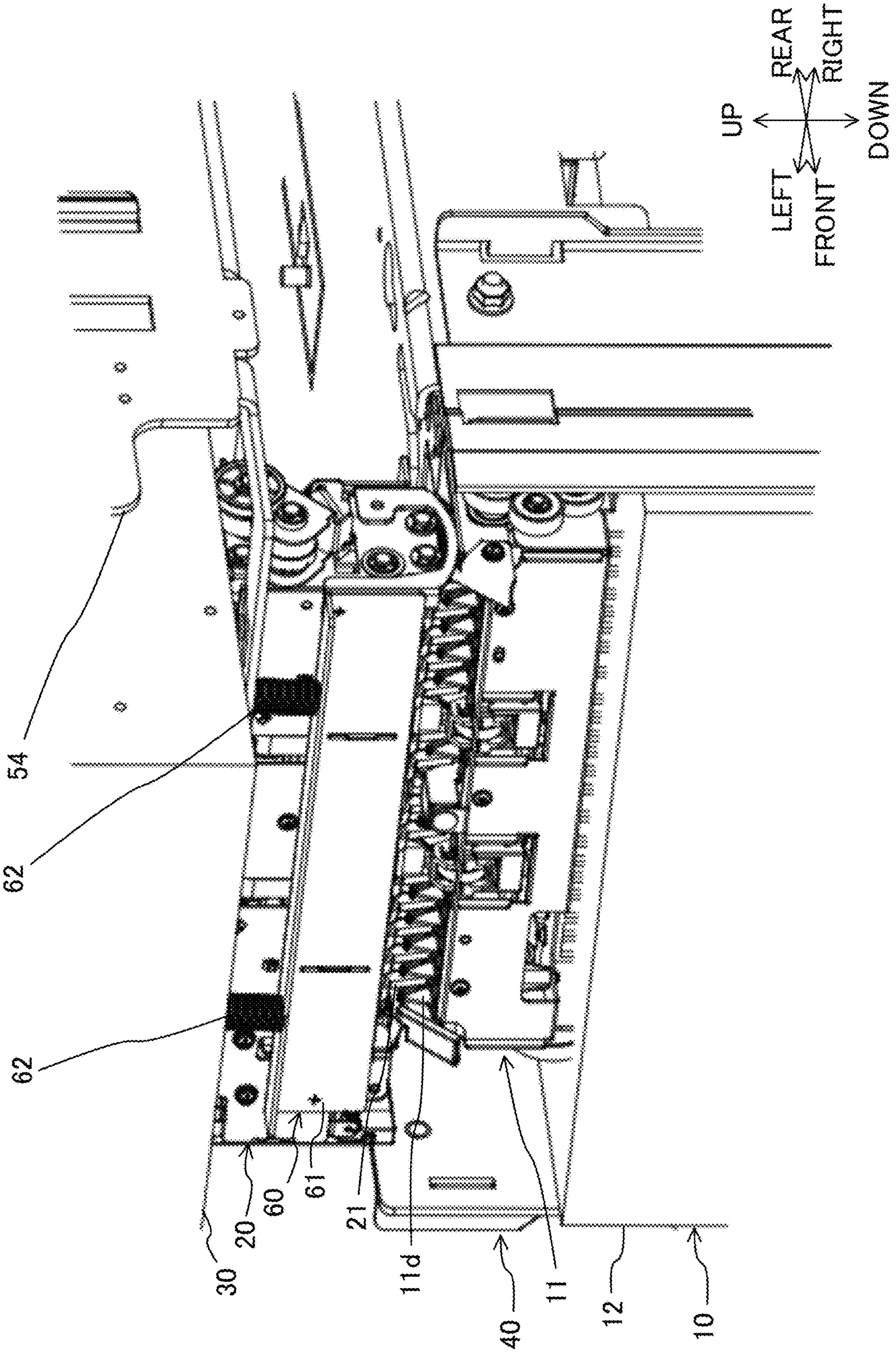
FIG. 3 is a perspective view illustrating the opening/closing conveyance unit and the intermediate conveyance unit according to the embodiment.

As illustrated in FIGS. 2 and 3, the intermediate conveyance unit 20 is disposed above the front portion of the opening/closing conveyance unit 11 and conveys a banknote in the upward-and-downward direction between the lower module 10 (opening/closing conveyance unit 11) and the upper module 30. It is noted that the intermediate conveyance unit 20 is an example of a cross conveyance unit (cross conveyor) that conveys a banknote (a paper sheet) to and from the lower module 10 (drawer module) in a cross direction crossing a pull-out direction of the lower module 10. The cross direction is not limited to the upward-and-downward direction as long as the cross direction crosses the pull-out direction (forward-and-rearward direction) of the lower module 10.

The intermediate conveyance unit 20 includes a comb tooth guide 21 provided at a lower end (lower module 10 side) and a comb tooth guide 22 provided at an upper end (upper module 30 side). It is noted that a partition member (not illustrated) that separates the lower module 10 from the upper module 30 is disposed behind the intermediate conveyance unit 20. The partition member is, for example, a part of a safe that houses the lower module 10 (frame 40).

As illustrated in FIG. 2, the comb tooth guide 21 extends downwards toward the lower module 10 (opening/closing conveyance unit 11) in the housed state, and is positioned so as to be alternately aligned in the left-and-right direction with the comb tooth guide 11*d* of the lower module 10 (opening/closing conveyance unit 11), thereby guiding the banknote. Further, the comb tooth guide 22 extends upwards toward the upper module 30 in the housed state, and is positioned so as to be alternately aligned in the left-and-right direction with the comb tooth guide (not illustrated) of the upper module 30, thereby guiding the banknote.

It is noted that the comb tooth guides 21 and 22, the comb tooth guide 11*d* of the above-described lower module 10 (opening/closing conveyance unit 11), and the comb tooth guide of the upper module 30 (not illustrated) are preferably rotatable so as to fall from a guiding state to a retracted state when load is applied at the time of occurrence of a jam, thereby preventing damage of the comb tooth guide and banknote damage. In addition, these comb tooth guides may be moved by a mechanism (not illustrated) so as to be in the guiding state when the lower module 10 or the upper module 30 is housed and to be in the retracted state retracted from the guiding state when the lower module 10 or the upper module is pulled out.

The upper module 30 illustrated in FIG. 1 is preferably capable of conveying a banknote to and from the intermediate conveyance unit 20 and pulling out the banknote forwards or rearwards along a plurality of slide rails such as a slide rail 54 extending in the forward-and-rearward direction. For example, the upper module 30 conveys the banknote received from a customer to the intermediate conveyance unit 20 (lower module 10), and delivers the withdrawn banknote from the intermediate conveyance unit 20 (lower module 10).

The frame 40 houses the lower module 10. The slide rails 51 to 53 and 55 described above for enabling the lower module 10 to be drawable in the forward-and-rearward direction are fixed to the frame 40.

Figure 7:
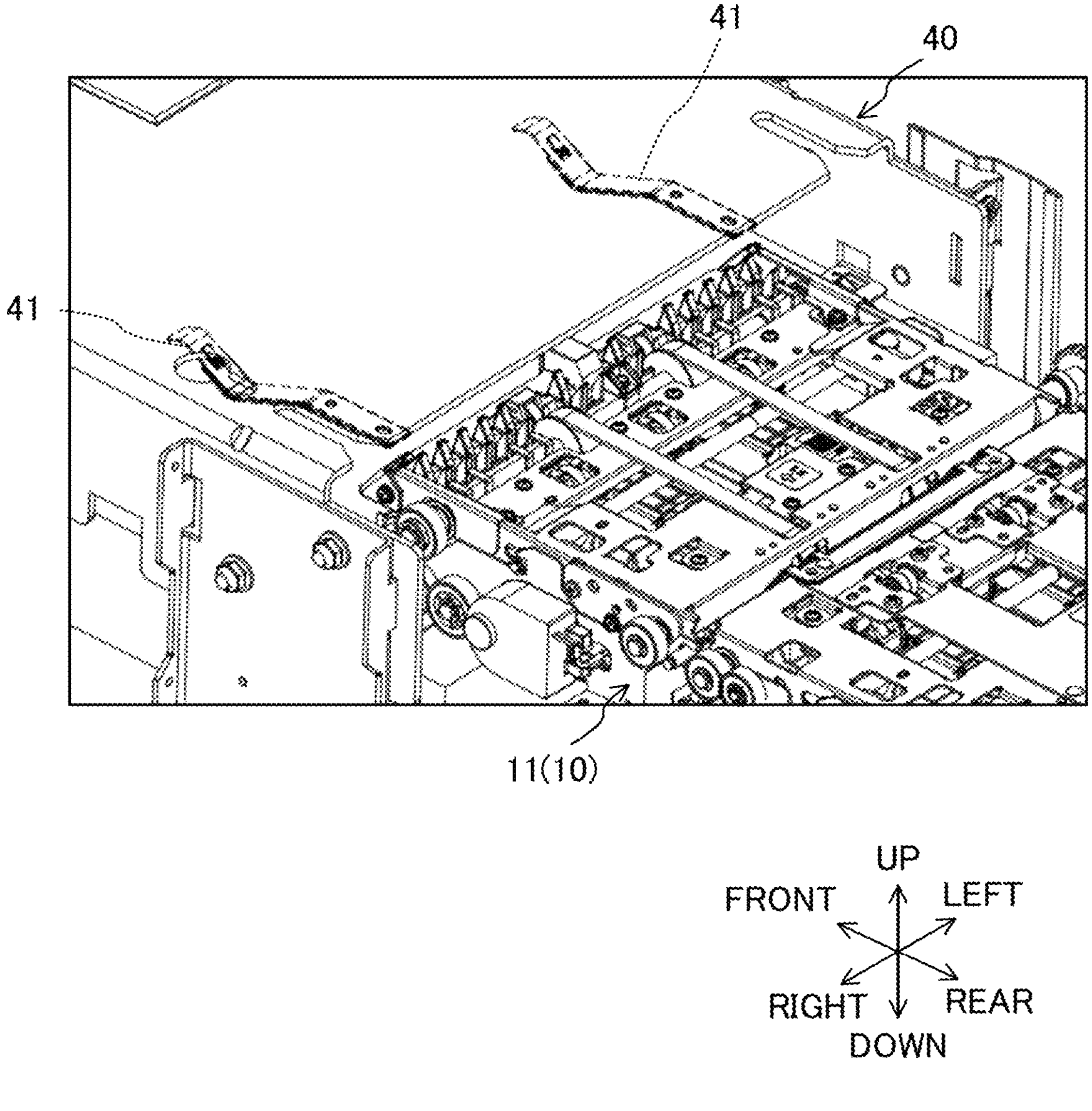
FIG. 7 is a perspective view illustrating a part of the lower module pulled out to the rear side in the embodiment.

As illustrated in FIG. 7, two leaf springs 41 (since two leaf springs are hidden by the frame 40, they are not shown in the drawing, so each of the leaf springs is illustrated by a broken line which is a hidden line) are provided on the inner upper surface at the rear end of the frame 40. The leaf spring 41 protrudes toward the lower module 10 (downwards) in a V shape, and biases the lower module 10 downwards (in the cross direction crossing the pull-out direction). The leaf spring 41 is fixed to the inner upper surface of the frame 40 in a long hole extending in the forward-and-rearward direction of the leaf spring 41 so as to be retractable forwards at the time of contacting the lower module 10. Instead of the leaf spring 41, another elastic body such as rubber or another spring may be disposed, or the leaf spring 41 may be omitted in a case where the lower module 10 is not pulled out rearwards.

As illustrated in FIG. 3, the guide mechanism 60 includes a biasing guide 61 and two compression springs 62.

The biasing guide 61 is disposed at a lower end (an end portion on the lower module 10 side) of the intermediate conveyance unit 20, and biases the lower module 10 downwards (an example of the cross direction) by being biased downwards by the two compression springs 62, each of which is an example of an elastic body. It is noted that an upper end which is one end of the compression spring 62 is fixed to, for example, the upper module 30, a member for accommodating the upper module 30, and a fixing member such as the intermediate conveyance unit 20. Further, when the biasing guide 61 itself is an elastic body such as a leaf spring, the elastic body (compression spring 62) can be omitted.

Figure 4:
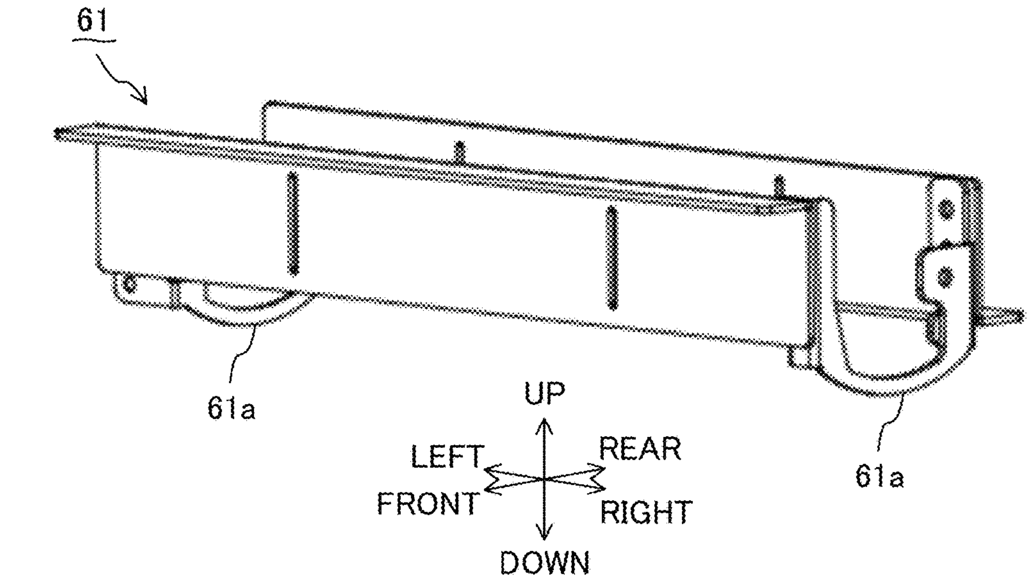
FIG. 4 is a perspective view illustrating a biasing guide according to the embodiment.

As illustrated in FIG. 4, the biasing guide 61 has a U shape in right side view, and a guide surface 61*a* at a lower end which is a tip is curved such that a central portion in the forward-and-rearward direction (the pull-out direction of the lower module 10) is located closest to the side of the lower module 10.

Here, housing of the lower module 10 from the front side when the opening/closing conveyance unit 11 is in a half-opened half-locked state S1 will be described with reference to FIGS. 6A to 6D.

Figure 6A:
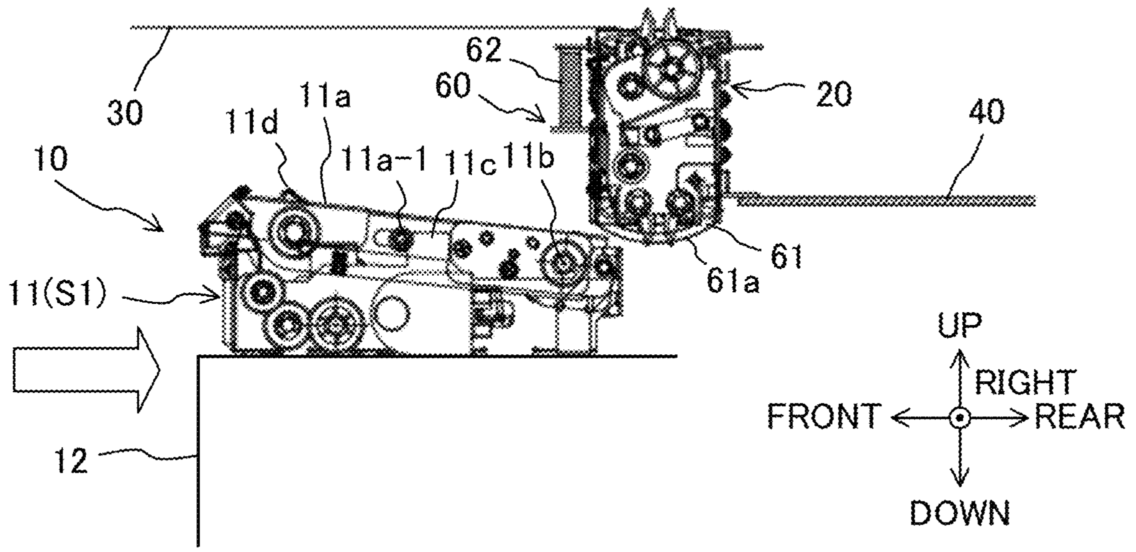
FIG. 6A is a right side view (part 1) illustrating housing of a lower module from the front side in the embodiment.

As illustrated in FIG. 6A, the biasing guide 61 is biased downwards by the compression spring 62. Further, the guide surface 61*a* of the biasing guide 61 is located below the lower end of the intermediate conveyance unit 20 and the frame 40 (the upper portion of the frame 40).

Figure 6B:
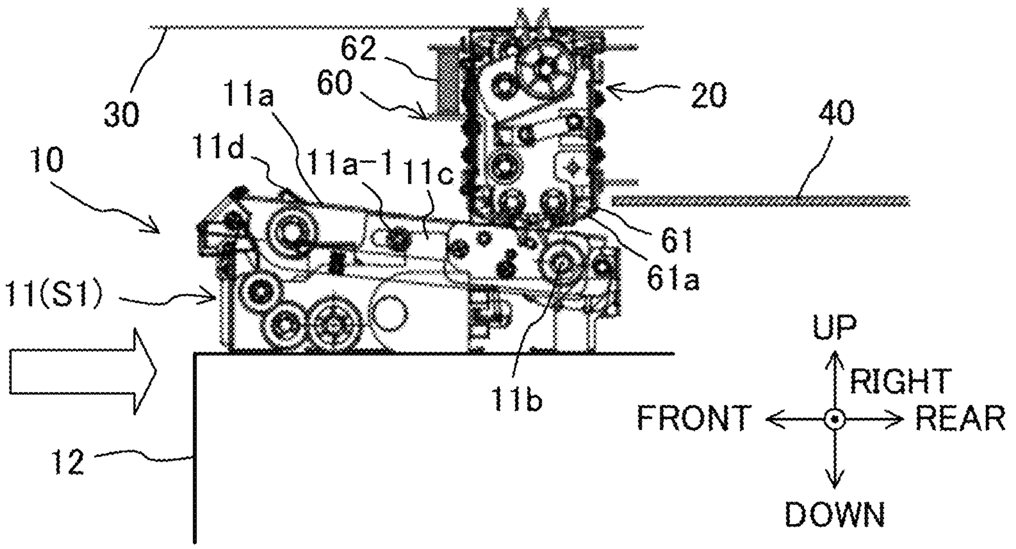
FIG. 6B is a right side view (part 2) illustrating housing of the lower module from the front side in the embodiment.

As illustrated in FIG. 6B, since the opening/closing conveyance unit 11 is in the half-locked state S1, the upper surface of the opening portion 11*a* is inclined upwards toward the front side. Therefore, when the opening/closing conveyance unit 11 is in the half-locked state S1, the lower module 10 is housed from the front side, and the opening/closing conveyance unit 11 reaches the lower side of the biasing guide 61, the opening/closing conveyance unit 11 comes into contact with the biasing guide 61 and is biased downwards.

Figure 6C:
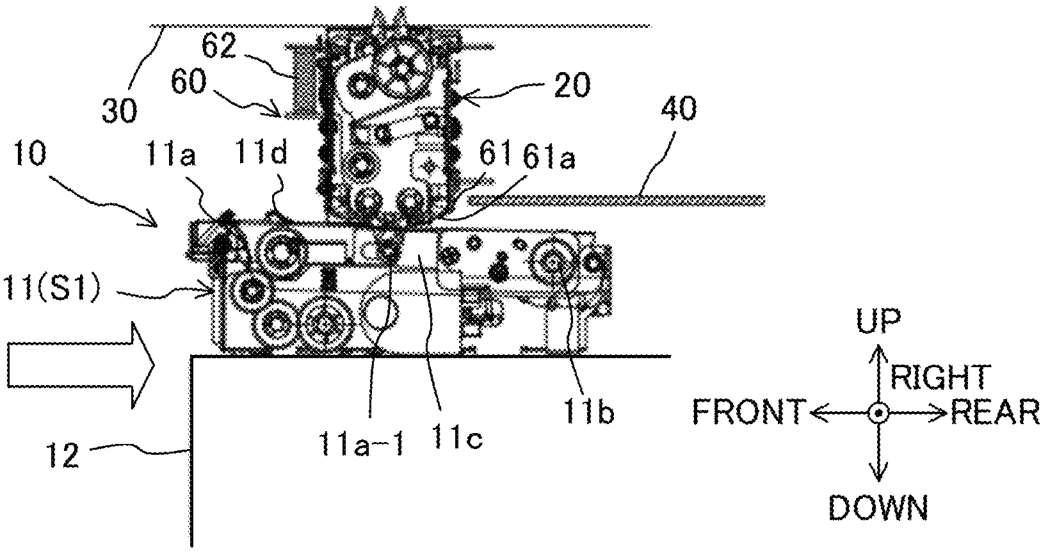
FIG. 6C is a right side view (part 3) illustrating housing of the lower module from the front side in the embodiment.

Thereafter, as illustrated in FIG. 6C, as the lower module 10 is further housed, the opening portion 11*a* approaches a horizontal state thereof with the opening/closing shaft 11*b* as a rotation center.

Figure 6D:
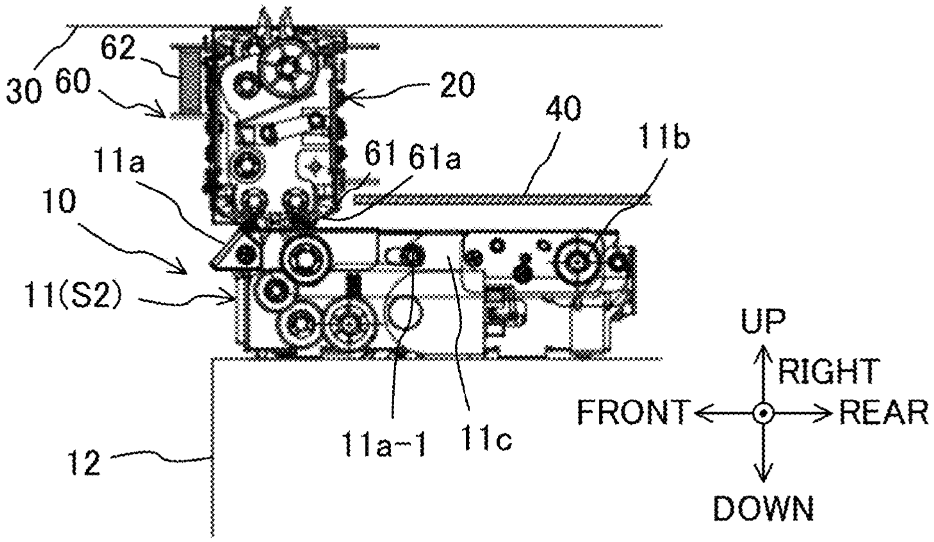
FIG. 6D is a right side view (part 4) illustrating housing of the lower module from the front side in the embodiment.

Then, as illustrated in FIG. 6D, when the lock shaft 11*a*-1 is hooked and locked by the lock member 11*c*, the opening/closing conveyance unit 11 enters a locked state S2.

Next, housing of the lower module 10 from the rear side when the opening/closing conveyance unit 11 is in the half-opened half-locked state S1 will be described with reference to FIGS. 8A to 8E.

Figure 8A:
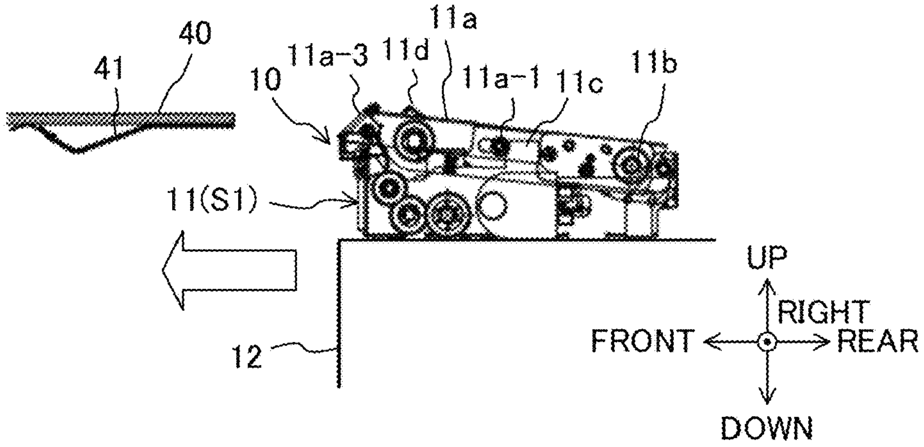
FIG. 8A is a right side view (part 1) illustrating housing of the lower module from the rear side in the embodiment.

As illustrated in FIG. 8A, the above-described leaf spring 41 protrudes downwards in a V shape from the inner upper surface of the frame 40.

Figure 8B:
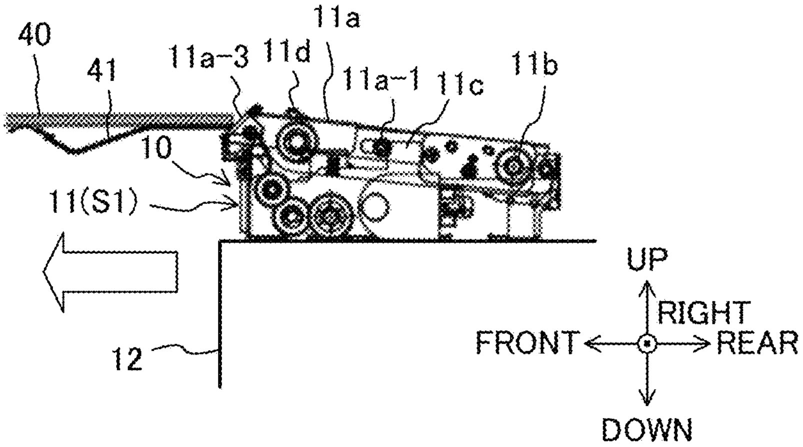
FIG. 8B is a right side view (part 2) illustrating housing of the lower module from the rear side in the embodiment.

As illustrated in FIG. 8B, when the opening/closing conveyance unit 11 is in the half-locked state S1, the upper surface of the opening portion 11*a* may be inclined upwards toward the front side up to a height in contact with the upper portion of the frame 40. In this case, the tip guide 11*a*-3 provided at the front end of the opening portion 11*a* comes into contact with the upper portion of the frame 40.

Figure 8C:
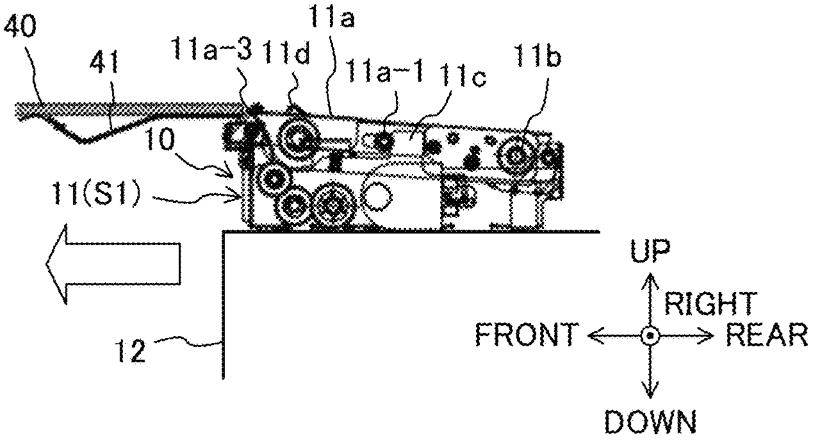
FIG. 8C is a right side view (part 3) illustrating housing of the lower module from the rear side in the embodiment.

However, as illustrated in FIG. 8C, since the tip guide 11*a*-3 is provided so as to be inclined downwards toward the front side, the opening portion 11*a* is pressed downwards by the frame 40.

Figure 8D:
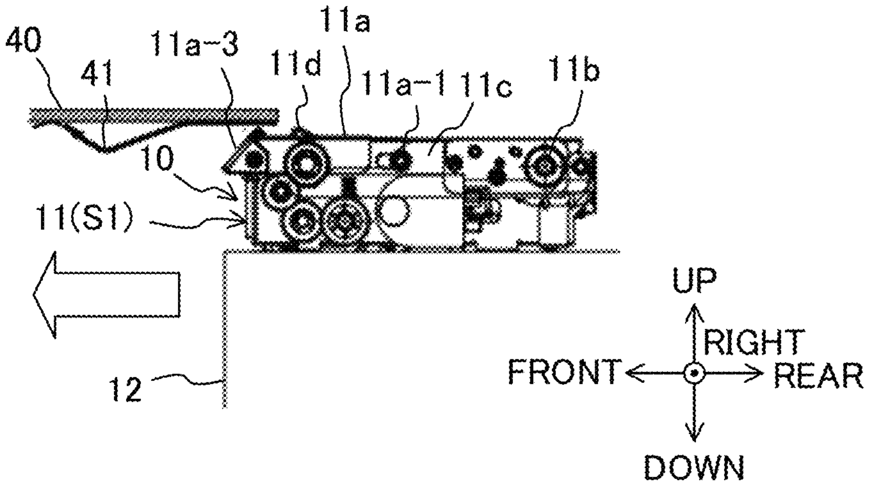
FIG. 8D is a right side view (part 4) illustrating housing of the lower module from the rear side in the embodiment.

As a result, as illustrated in FIG. 8D, the opening portion 11*a* approaches a horizontal state thereof with the opening/closing shaft 11*b* as a rotation center, and can get under the upper portion of the frame 40.

Figure 8E:
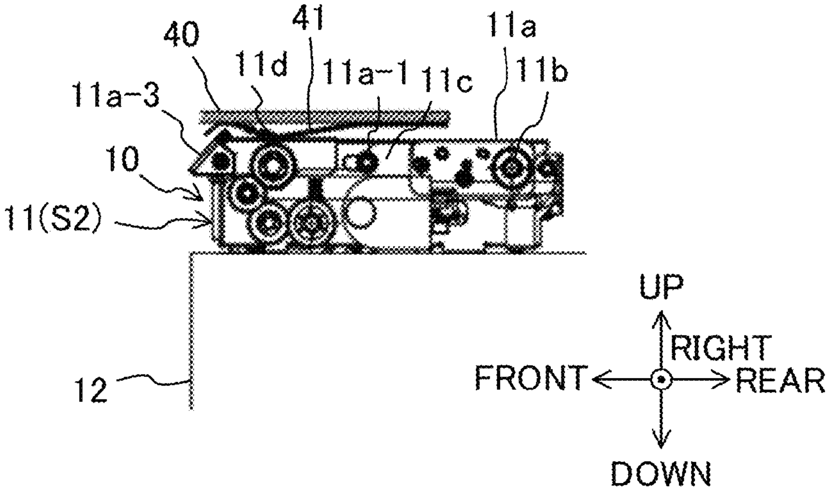
FIG. 8E is a right side view (part 5) illustrating housing of the lower module from the rear side in the embodiment.

Thereafter, as illustrated in FIG. 8E, when the lower module 10 is further housed, the opening portion 11*a* is pressed downwards by the leaf spring 41, and when the lock shaft 11*a*-1 is locked by being hooked on the lock member 11*c*, the opening/closing conveyance unit 11 enters the locked state S2.

Figure 9A:
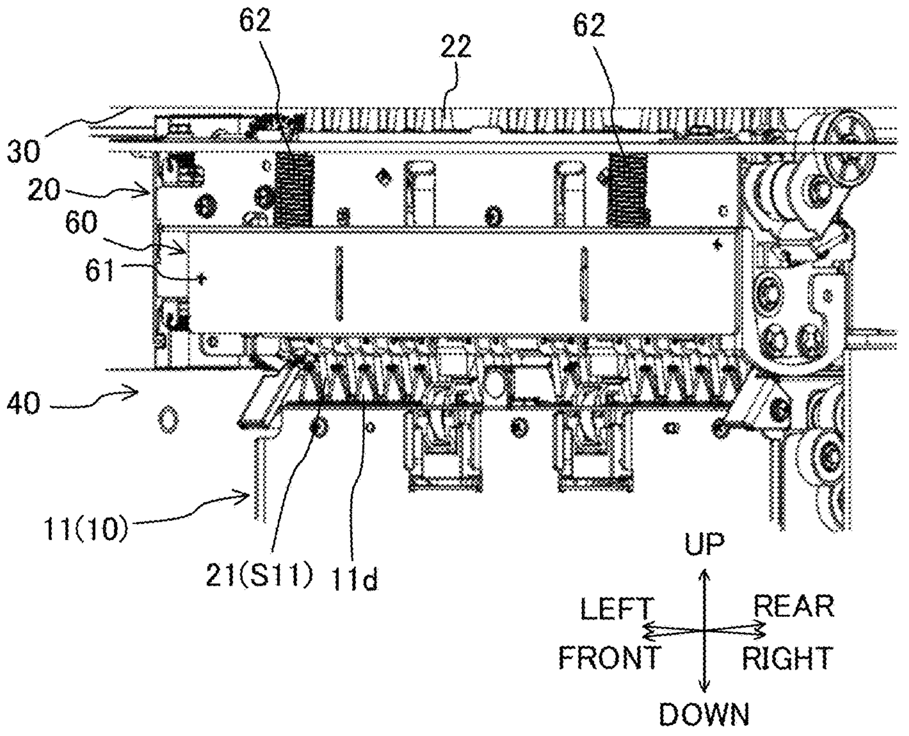
FIG. 9A is a perspective view illustrating a guiding state of a comb tooth guide of the intermediate conveyance unit according to the embodiment.

Meanwhile, as illustrated in FIG. 9A, the comb tooth guide 21 at the lower end of the intermediate conveyance unit 20 described above extends downwards toward the lower module 10 (opening/closing conveyance unit 11) in the housed state, and is positioned so as to be alternately aligned in the left-and-right direction with the comb tooth guide 11*d* of the lower module 10 (guiding state S11), thereby guiding the banknote.

Figure 9B:
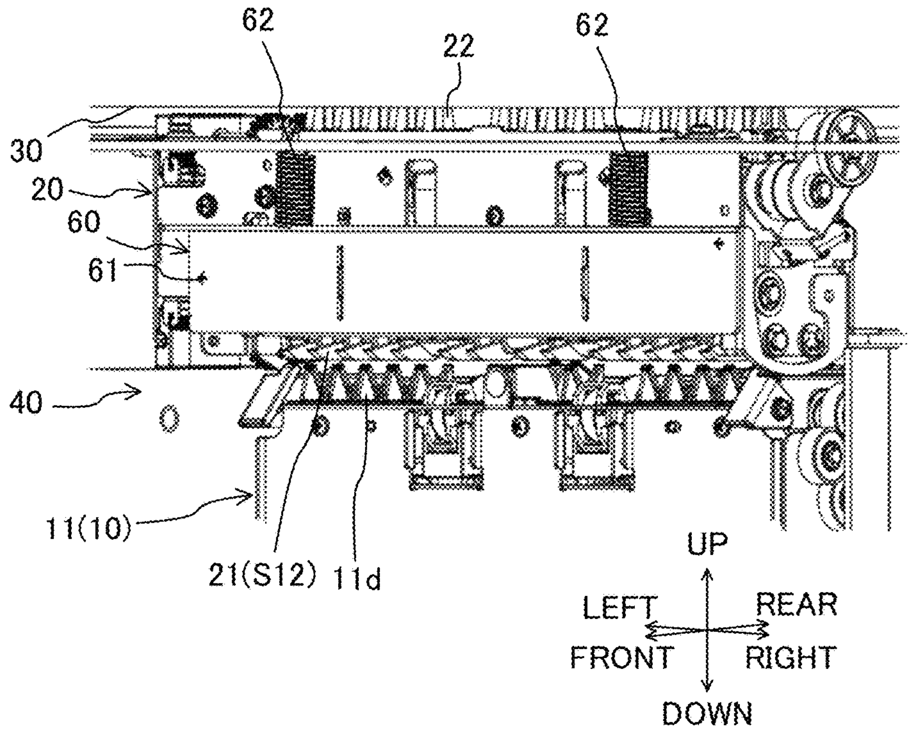
FIG. 9B is a perspective view illustrating a retracted state of the comb tooth guide of the intermediate conveyance unit according to the embodiment.

On the other hand, for example, after the lower module 10 starts to be pulled out of the frame 40, the comb tooth guide 21 is preferably retracted from the guiding state S11, as illustrated in FIG. 9B, by the above-described mechanism (not illustrated) (retracted state S12).

However, when the comb tooth guide 21 is not retracted to the retracted state S12 due to catching of the banknote or the like at the time of occurrence of the jam, there is a possibility that the comb tooth guide 21 or a member in contact with the comb tooth guide 21 is damaged or the banknote is damaged at the time of pulling out the lower module 10 or the like.

Therefore, as illustrated in FIGS. 10A to 12B in the modification, a retracting mechanism 70 that retreats the comb tooth guide 21 to the retracted state S12 may be disposed in the banknote processing machine 1.

Figure 10A:
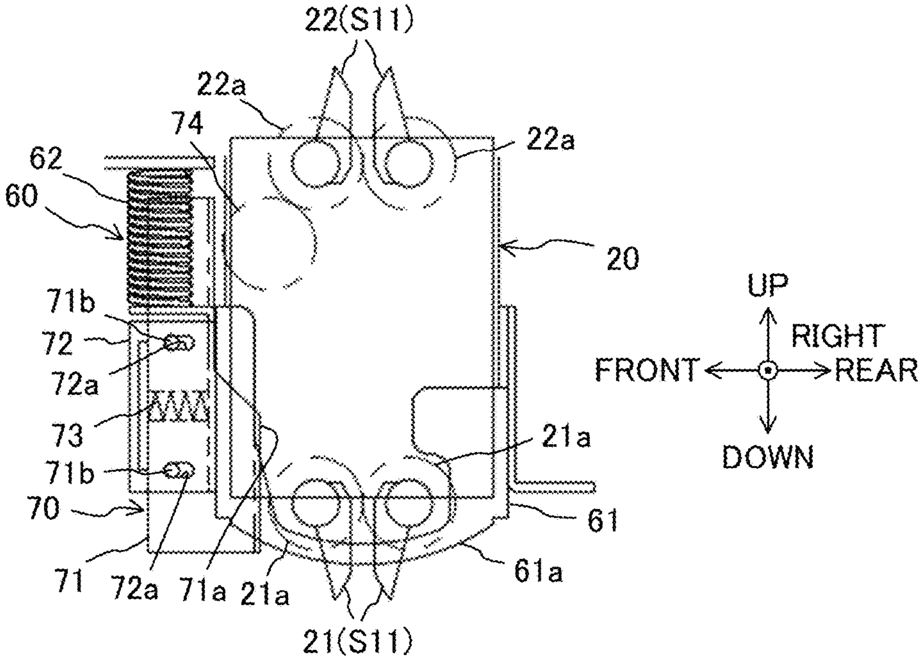
FIG. 10A is a right side view (part 1) illustrating a retracting mechanism, an intermediate conveyance unit, and a guide mechanism in a modification of the embodiment.
Figure 10B:
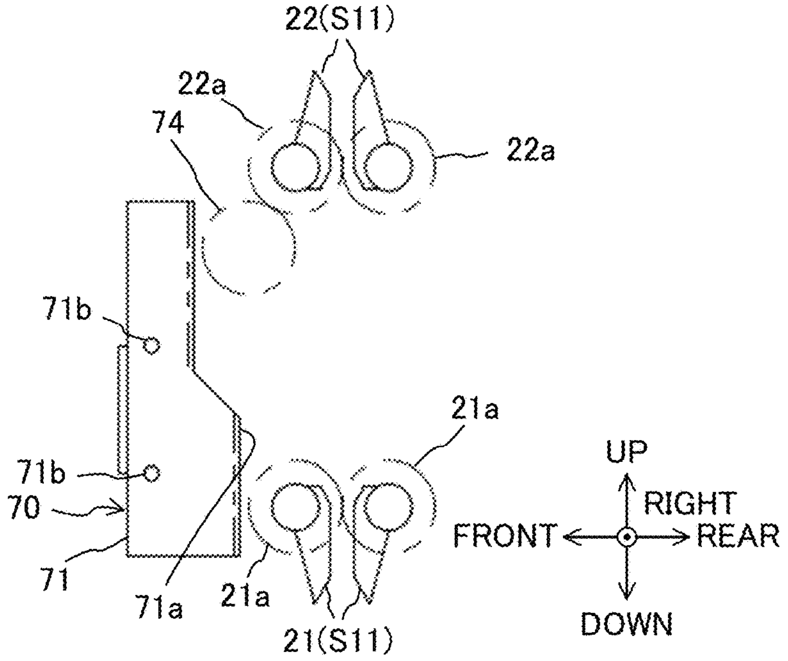
FIG. 10B is a right side view (part 1) illustrating the retracting mechanism in the modification of the embodiment.

As illustrated in FIGS. 10A and 10B, the retracting mechanism 70 includes a rack 71, a base portion 72, a spring 73, and a gear 74.

The rack 71 is provided with a tooth surface 71*a* extending in the upward-and-downward direction on the rear surface, and for example, two pins 71*b* (only two pins 71*b* at the right end are illustrated) protrude from the left and right ends.

The tooth surface 71*a* has a lower portion positioned on the rear side and an upper portion positioned on the front side. The lower portion of the tooth surface 71*a* meshes with a gear 21*a* of the comb tooth guide 21. On the other hand, the upper portion of the tooth surface 71*a* meshes with the gear 74 meshing with a gear 22*a* of the comb tooth guide 22.

The base portion 72 illustrated in FIG. 10A is fixed to the biasing guide 61. The base portion 72 is provided with a long hole 72*a* formed to extend in the forward-and-rearward direction and configured to allow the pin 71*b* of the above-described rack 71 to be inserted thereinto. As a result, the rack 71 described above is movable in the forward-and-rearward direction with respect to the base portion 72 and the biasing guide 61. Further, the rack 71 can ascend and descend together with the base portion 72 and the biasing guide 61.

The spring 73 is, for example, a compression spring having one end (front end) fixed to the rack 71 and the other end (rear end) fixed to the biasing guide 61. The spring 73 urges the rack 71 forwards such that the rack 71 (tooth surface 71*a*) does not mesh with the gear 21*a* of the comb tooth guide 21 and the gear 74.

Figure 11A:
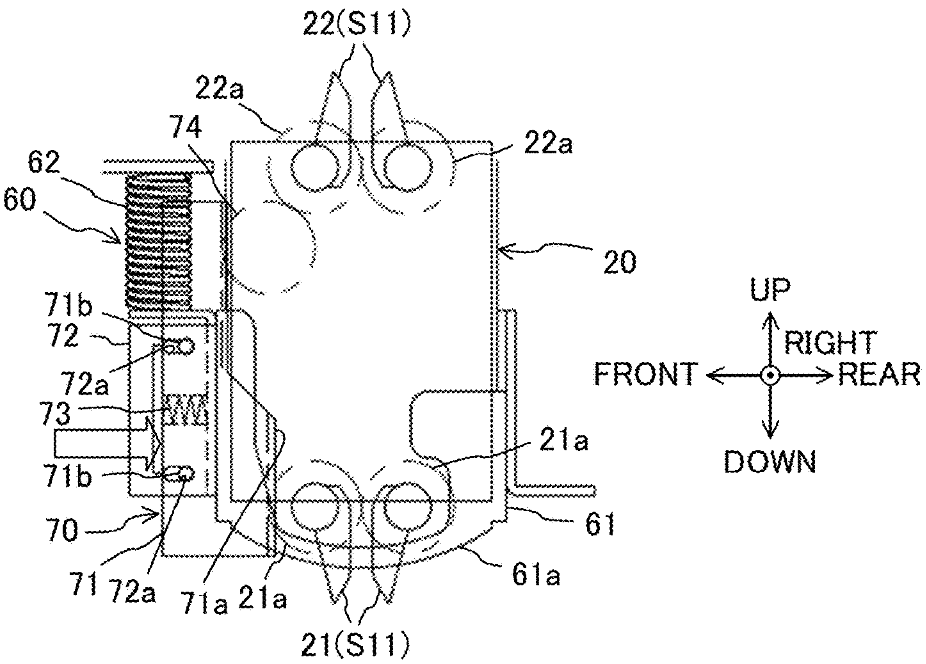
FIG. 11A is a right side view (part 2) illustrating the retracting mechanism, the intermediate conveyance unit, and the guide mechanism in the modification of the embodiment.
Figure 11B:
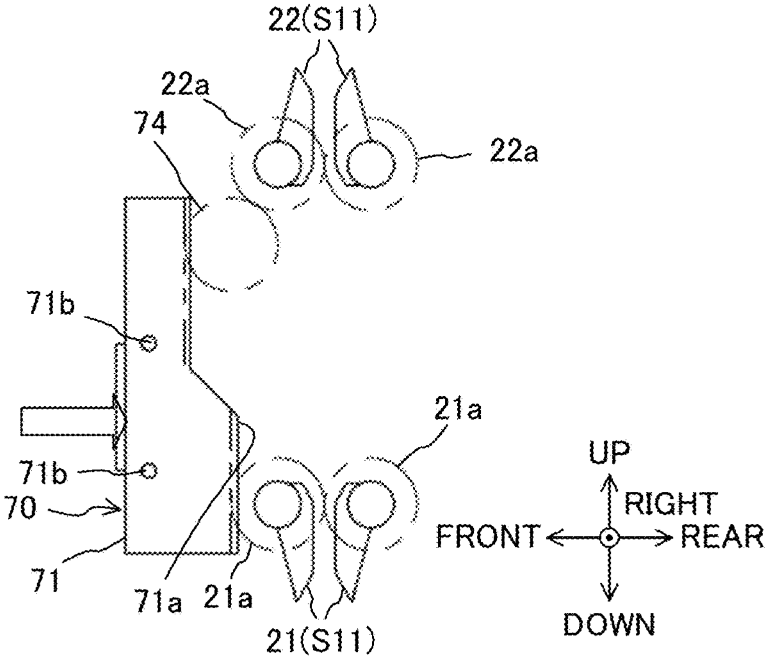
FIG. 11B is a right side view (part 2) illustrating the retracting mechanism in the modification of the embodiment.

As illustrated in FIGS. 11A and 11B, when the rack 71 is pushed rearwards, for example, manually against elastic force of the spring 73, the lower portion of the tooth surface 71*a* of the rack 71 meshes with the gear 21*a* of the comb tooth guide 21, and the upper portion of the tooth surface 71*a* meshes with the gear 74.

Figure 12A:
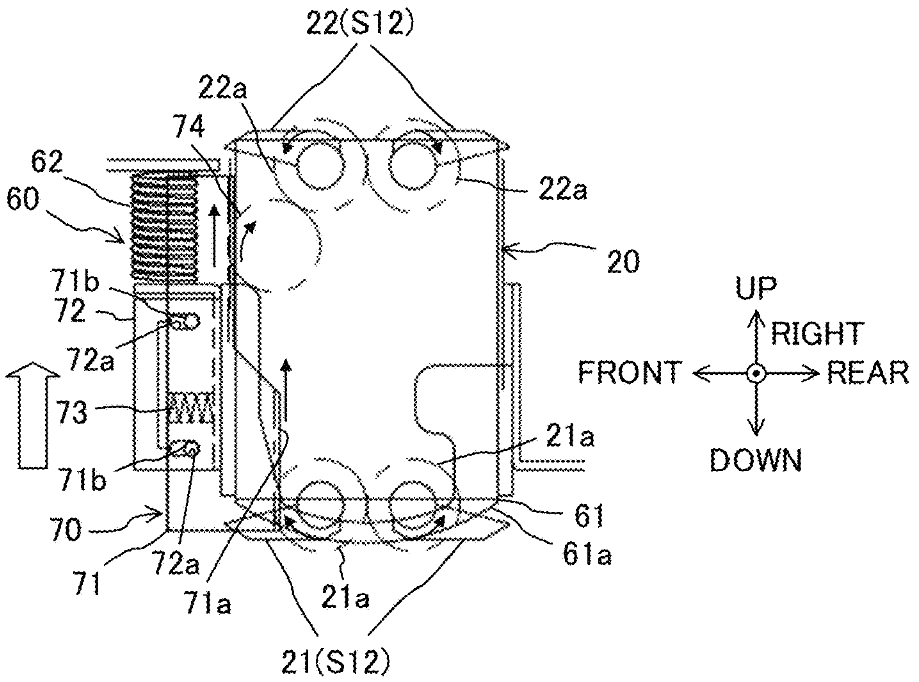
FIG. 12A is a right side view (part 3) illustrating the retracting mechanism, the intermediate conveyance unit, and the guide mechanism in the modification of the embodiment.
Figure 12B:
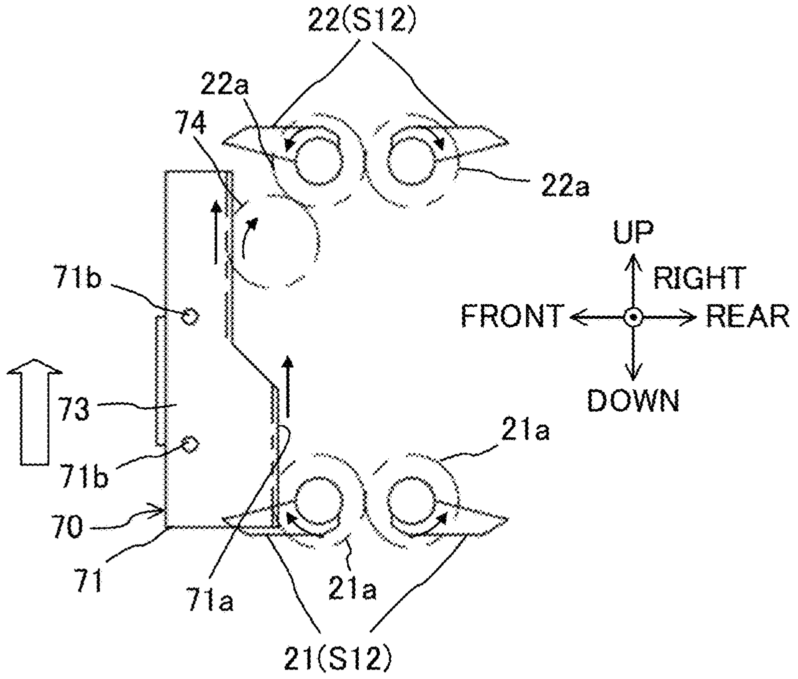
FIG. 12B is a right side view (part 3) illustrating the retracting mechanism in the modification of the embodiment.

Thereafter, as illustrated in FIGS. 12A and 12B, when the biasing guide 61 is manually pushed upwards (opposite to the lower module 10), for example, the rack 71 moves upwards integrally with the biasing guide 61, and accordingly, the comb tooth guide 21 and the gear 74 meshing with the tooth surface 71*a* of the rack 71 rotate, and the gear 22*a* of the comb tooth guide 22 meshing with the gear 74 rotates. As a result, the comb tooth guides 21 and 22 rotate and transition from the guiding state S11 to the retracted state S12.

It is noted that, in the above description, the biasing guide 61 is provided at the lower end of the intermediate conveyance unit 20 (an example of the cross conveyor), but for example, the intermediate conveyance unit 20 may be disposed on one of the left and right sides of the lower module 10 (an example of the drawer module), and may be disposed at the left end or the right end which is the end portion of the intermediate conveyance unit 20 on the lower module 10 side when the banknote is conveyed in the left-and-right direction.

In the present embodiment, for example, the biasing guide 61 biases the opening/closing conveyance unit 11 so as to set the opening/closing conveyance unit 11 in the half-locked state S1 to the locked state S2, so that it is possible to suppress occurrence of damage when the opening/closing conveyance unit 11 is housed in the half-locked state S1, but the biasing guide 61 may bias the drawer module not having the opening/closing conveyance unit 11.

In the present embodiment, the banknote processing machine 1 includes, as an example of the cross conveyor, the intermediate conveyance unit 20 that conveys a banknote between the lower module 10 and the upper module 30, but the cross conveyor is not limited to one that conveys a banknote between two modules.

Further, in the present embodiment, the banknote processing machine 1 includes the lower module 10 and the upper module 30, but the banknote processing machine 1 may include at least one drawer module (for example, the lower module 10). The configuration of each unit of the banknote processing machine 1 is also freely selected, and for example, the retracting mechanism 70 in the modification is not limited to the configuration including the rack 71, the base portion 72, the spring 73, and the gear 74.

In the present embodiment described above, the banknote processing machine 1, which is an example of the paper sheet handling apparatus, includes the lower module 10, which is an example of a drawable drawer module, the intermediate conveyance unit 20, which is an example of a cross conveyance unit, and the biasing guide 61. The intermediate conveyance unit 20 conveys a banknote (paper sheet) to and from the lower module 10 in the cross direction (downwards) crossing the pull-out direction (forward-and-rearward direction) of the lower module 10. The biasing guide 61 is disposed at the lower end of the intermediate conveyance unit 20 (an example of an end portion on the lower module 10 side) and biases the lower module 10 in the cross direction (downwards).

As described above, the biasing guide 61 biases the lower module 10 downwards, so that even if a gap between the lower module 10 and the intermediate conveyance unit 20 is not an optimum gap in consideration of an assembly accumulation error including a component dimensional variation, the biasing guide 61 is pushed back to the lower module 10 if the gap is narrow, and contact between the intermediate conveyance unit 20 and the lower module 10 can be prevented. Further, since the biasing guide 61 biases the lower module 10 downwards, even if the gap between the lower module 10 and the intermediate conveyance unit 20 is wide, the biasing guide 61 can set the opening/closing conveyance unit 11 in the half-locked state S1 to the locked state S2 or can guide housing of the lower module 10 as described later. Therefore, according to the present embodiment, it is possible to press the lower module 10 (drawer module) in the cross direction crossing the pull-out direction while avoiding damage.

Further, in the present embodiment, the lower module 10, which is an example of the drawer module, includes the opening/closing conveyance unit 11 which can be opened and closed, and the biasing guide 61 biases the opening/closing conveyance unit 11 to be in the locked state S2.

As a result, it is possible to prevent the opening/closing conveyance unit 11 in the half-locked state S1 from contacting the frame 40 or the like at the time of housing, and to prevent the opening/closing conveyance unit 11, the frame 40, and the like from being damaged. Furthermore, since a stroke amount for causing the opening/closing conveyance unit 11 to transition to the locked state S2 is increased by elasticity of the biasing guide 61, the opening/closing conveyance unit 11 can reliably transition to the locked state S2.

In the present embodiment, the tip (guide surface 61*a*) of the biasing guide 61 is curved such that the central portion in the pull-out direction is located closest to the lower module 10 side.

Accordingly, when the lower module 10 is housed from the front side (or when it is housed from the rear side), it is possible to prevent the lower module 10 from contacting the biasing guide 61 and being damaged.

Further, in the modification of the present embodiment, the intermediate conveyance unit 20 includes the comb tooth guide 21 that is movable to the guiding state S11 extending toward the lower module 10 and the retracted state S12 retracted from the guiding state S11. The banknote processing machine 1 further includes the retracting mechanism 70 that moves the comb tooth guide 21 (and the comb tooth guide 22) to the retracted state S12 when the biasing guide 61 is pressed to the opposite side (upwards) from the lower module 10.

As a result, for example, in a case where the banknote is caught between the comb tooth guide 21 of the intermediate conveyance unit 20 and the comb tooth guide 11*d* of the lower module 10 at the time of occurrence of the jam, the comb tooth guide 21 is moved to the retracted state S12 by a simple work of lifting the biasing guide 61 before the lower module 10 is pulled out, and the load due to the remaining banknote can be reduced, thereby making it possible to prevent occurrence of damage of each unit and banknote damage.

It is noted that the present invention is not limited to the above-described embodiment as it is, and can be embodied by modifying the components thereof. For example, various inventions can be formed by appropriately combining the plurality of components disclosed in the present embodiment. As described above, various modifications and applications of the invention can be made without departing from the gist of the invention.

The invention claimed is:

1. A paper sheet handling apparatus comprising: a drawable drawer module;

a cross conveyor configured to convey, between the cross conveyor and the drawer module, a paper sheet in a cross direction crossing a pull-out direction of the drawer module; and a biasing guide disposed at an end portion of the cross conveyor on a side of the drawer module and configured to bias the drawer module in the cross direction, wherein the drawer module includes an openable and closable opening/closing conveyor, and the biasing guide biases the opening/closing conveyor to be in a locked state.

2. The paper sheet handling apparatus according to claim 1, wherein the biasing guide has a curved tip so as to allow a central portion of the biasing guide in the pull-out direction to be located closest to the side of the drawer module.

3. The paper sheet handling apparatus comprising:

a drawable drawer module:

a cross conveyor configured to convey, between the cross conveyor and the drawer module, a paper sheet in a cross direction crossing a pull-out direction of the drawer module; and a biasing guide disposed at an end portion of the cross conveyor on a side of the drawer module and configured to bias the drawer module in the cross direction, wherein the cross conveyor includes a comb tooth guide configured to be movable between a guiding state extending toward the side of the drawer module and a retracted state retracted from the guiding state, and the paper sheet handling apparatus further comprises a retracting mechanism configured to move the comb tooth guide to the retracted state when the biasing guide is pressed to a side opposite to the drawer module.

* * * * *